US008445122B2

(12) United States Patent
Deguet et al.

(10) Patent No.: US 8,445,122 B2
(45) Date of Patent: May 21, 2013

(54) DATA STORAGE MEDIUM AND ASSOCIATED METHOD

(75) Inventors: Chrystel Deguet, Saint Ismier (FR);
Laurent Clavelier, Grenoble (FR);
Franck Fournel, Villard-Bonnot (FR);
Jean-Sebastien Moulet, Grenoble (FR)

(73) Assignees: Commissariat a l'Energie Atomique, Paris (FR); S.O.I. Tec Silicon on Insulator Technologies, Bernin (FR)

( * ) Notice: Subject to any disclaimer, the term of this patent is extended or adjusted under 35 U.S.C. 154(b) by 546 days.

(21) Appl. No.: 12/338,281

(22) Filed: Dec. 18, 2008

(65) Prior Publication Data

US 2009/0161405 A1    Jun. 25, 2009

(30) Foreign Application Priority Data

Dec. 21, 2007  (FR) .................................. 07 60297

(51) Int. Cl.
*G11C 11/22* (2006.01)
*H01L 21/02* (2006.01)

(52) U.S. Cl.
USPC ........... 428/812; 428/826; 428/836; 365/145; 438/3; 257/E21.002

(58) Field of Classification Search
None
See application file for complete search history.

(56) References Cited

U.S. PATENT DOCUMENTS

| 5,374,564 | A | 12/1994 | Bruel | |
|---|---|---|---|---|
| 6,607,969 | B1 | 8/2003 | Kub et al. | |
| 6,670,659 | B1 * | 12/2003 | Gudesen et al. | 257/295 |
| 7,598,096 | B2 * | 10/2009 | Wang | 438/3 |
| 7,782,649 | B2 * | 8/2010 | Tran et al. | 365/145 |
| 2004/0002176 | A1 * | 1/2004 | Xu | 438/40 |
| 2004/0161887 | A1 * | 8/2004 | Hasegawa et al. | 438/200 |
| 2006/0211154 | A1 * | 9/2006 | Buehlmann et al. | 438/3 |
| 2006/0291364 | A1 * | 12/2006 | Kozicki | 369/126 |
| 2008/0142859 | A1 * | 6/2008 | Ma et al. | 257/295 |

FOREIGN PATENT DOCUMENTS

| EP | 1 803 683 A1 | 12/2006 |
|---|---|---|
| FR | 2 862 802 B1 | 11/2004 |
| FR | 2 895 391 | 12/2005 |
| WO | WO 99/05711 | 2/1999 |
| WO | WO 02/29876 A1 | 4/2002 |
| WO | WO 2005/045821 A1 | 5/2005 |

OTHER PUBLICATIONS

French Search Report Patent No. 0760297, dated Jun. 10, 2008.
Cho et al., "*Nanodomain manipulation for ultrahigh density ferroelectric data storage*", Institute of Physics Publishing, Nanotechnology, 17, S137-S141 (2006).

* cited by examiner

*Primary Examiner* — Kevin Bernatz
(74) *Attorney, Agent, or Firm* — Brinks Hofer Gilson & Lione

(57) ABSTRACT

A data storage medium includes a carrier substrate having an electrode layer on the surface thereof and a sensitive material layer extending along the electrode layer adapted to be locally modified between two electrical states by the action of a localized electric field. A reference plane extends globally parallel to the sensitive material layer and is configured to accommodate at least one element for application of an electrostatic field in combination with the electrode layer the electrode layer including a plurality of conductive portions having a dimension at most equal to 100 nm in at least one direction parallel to the reference plane and separated by at least one electrically insulative zone, where at least some of the conductive portions are electrically interconnected, the conductive portions defining data write/read locations within the sensitive material layer.

15 Claims, 9 Drawing Sheets

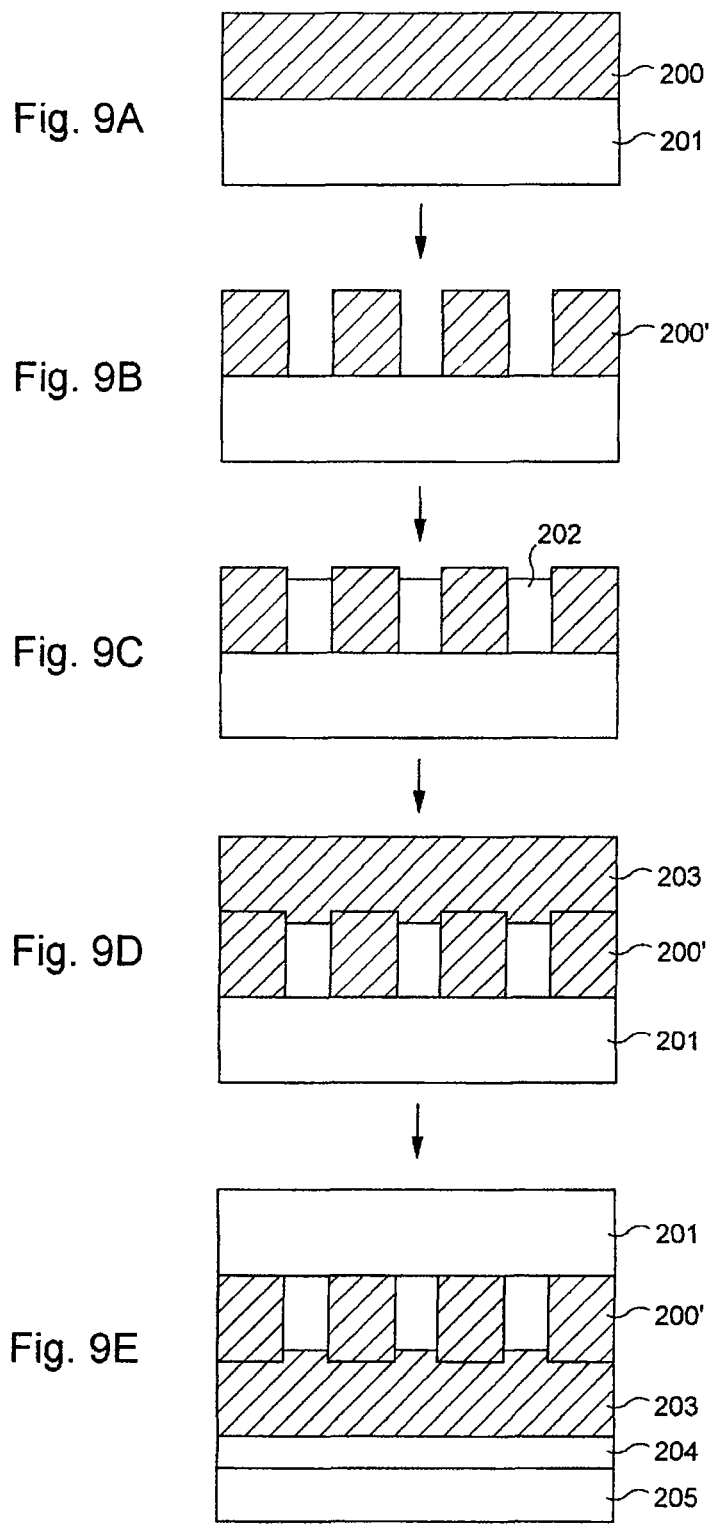

DATA STORAGE MEDIUM AND ASSOCIATED METHOD

RELATED APPLICATIONS

The present patent document claims the benefit of priority to French Patent Application No. 0760297, filed Dec. 21, 2007, which is incorporated herein by reference.

TECHNICAL FIELD

The present invention relates to a data storage medium and an associated method.

BACKGROUND

Layers of ferro-electric materials can be used to store data on a surface. Ferro-electric crystals are known to have a bipolar electrical moment even in the absence of an external electric field.

One way to create an array of data storage elements on a layer of ferro-electric material is to modify locally the ferro-electric characteristics of the material. The direction of the bipolar moment can be modified by applying an external electrostatic field.

Such modification can be achieved by locally applying an electrostatic field between a near field microscope tip positioned on one side of the layer and a plane counter electrode situated on the opposite side of the layer and parallel thereto.

It has been shown by Cho et al. (Cho et al; Nanotechnology, 17, 006, S137-S141) that a 10 V electrostatic field applied for 500 ps modifies the direction of polarization of an 18 nm thick ferro-electric crystal mounted on a chromium counter electrode.

The volumes of ferro-electric crystal whose ferro-electric nature is modified are referred to as nanodomains. The smallest nanodomain diameter (measured parallel to the layer) obtained experimentally by Cho et al. is 5.1 nm. These authors also prepared arrays of nanodomains on a layer. The smallest pitch obtained experimentally in a nanodomain array is 8.0 nm.

The polarization of each nanodomain constitutes one item of information, typically binary information. Generally, the smaller the nanodomains, the greater the density of the information that can be stored on a ferro-electric layer.

For example, it can be calculated that, if the ferro-electric properties are modified with an accuracy of the order of 5 nm, a memory can be obtained with a density of 10 Tbit per square inch (approximately 6.5 $cm^2$).

The area of the nanodomains on the surface of the ferro-electric layer is known to be directly proportional to the thickness of the ferro-electric layer.

The Smart Cut™ technology (see for example U.S. Pat. No. 5,374,564) can advantageously be used to obtain a thin ferro-electric layer. See for example U.S. Pat. No. 6,607,969, which describes the use of thin ferro-electric layers.

Transfer techniques including grinding and polishing steps can also be used. On this topic, see the paper by Cho et al. cited above.

In practice, the radii of curvature of near field microscope tips (for example those of an atomic force microscope (AFM)) are of the order of 10 nm or greater, which constitutes an important limiting factor. These points are conductive, for example covered with metal.

Note that according to the near field microscopy method used, the near field microscope tip can be in contact or not with the surface at the moment of application of the electrostatic field.

Moving the point toward the surface reduces the size of the nanodomains, although with a risk of degrading the surface.

In any event, it is difficult for the moment to obtain nanodomains with a size less than 5 nm, in particular because of the size of the microscope tips.

Moreover, it has been found that existing methods offer limited reproducibility in the formation of small nanodomains and the modification of their ferro-electric properties.

Two near field microscope tips are never completely identical and it is found that, from an operation of writing with a given point to another operation of writing with another point, the size and geometry of the resulting nanodomains vary.

SUMMARY

An object of the invention is to enable reliable and reproducible creation of very small nanodomains by minimizing the influence of the geometry of the writing point.

To solve this problem, the present invention proposes a data storage medium including:

a carrier substrate having electrode layer on the surface, a sensitive material layer extending along said electrode layer, the volume whereof is adapted to be locally modified between two electrical states by the action of a localized electric field, this medium having a reference plane globally parallel to the sensitive material layer, intended to have pass along it at least one element for application of an electrostatic field in combination with the electrode layer, characterized in that this medium includes, parallel to this reference plane, a plurality of conductive portions forming part of the electrode layer and separated by at least one electrically insulative zone, these electrically conductive portions having, in at least one direction parallel to the reference plane, a dimension at most equal to 100 nm, at least some of the conductive portions being electrically interconnected, these conductive portions defining data write/read locations within the sensitive material layer.

The electrode layer can be the substrate itself if it is sufficiently conductive.

The physical delimitation of conductive portions in the electrode layer by an electrically insulative material defines in advance write/read areas in the sensitive material layer and therefore controls the geometry of the write/read zones, referred to as nanodomains, at the same time as minimizing the influence of the geometry of the tip.

Said dimension is preferably at most equal to 50 nm.

According to one feature, each of the conductive portions of said plurality is at a distance of less than 100 nm from an adjacent conductive portion of said plurality, measured parallel to the reference plane.

This distance less than 100 nm is preferably measured parallel to the dimension less than 100 nm of a conductive portion.

According to one feature, the layer of sensitive material is a layer of ferro-electric material.

The ferro-electric material is lithium tantalate $LiTaO_3$, for example. It can be $BaTiO_3$, $SrTiO_3$, $LaAlO_3$ or any other ferro-electric material, even a non-monocrystalline material, such as PZT $(PbZr)TiO_3$, $Bi_4Ti_3O_{12}$ and $SrRuO_3$.

According to one feature, the medium further includes an oxide layer between the carrier substrate and the electrode layer.

In a general embodiment, the electrode layer and the sensitive material layer are plane and continuous.

For example, said conductive portions comprise crossover areas of lines of a first set of lines parallel to each other with lines of a second set of conductive lines parallel to each other, the lines of the second set meeting the lines of the first set transversely, these lines connecting said conductive portions together, the lines of the first and second sets of lines being coplanar.

In one embodiment, the lines of the first and second arrays are formed in dislocations at a bonding interface between two monocrystalline material structures, in at least two different directions, these lines interconnecting said conductive portions.

The conductive lines define rectangular or square meshes, for example.

In one embodiment the conductive portions include lands projecting toward the sensitive layer from an underlying conductive material layer.

This enables offering up to the sensitive material layer a conductive portion having a circumference of less than 100 nm parallel to the reference plane, which reduces the area of the data write/read locations, their dimension in each direction being limited by the size of the lands.

For example, the underlying layer includes conductive lines crossing each other.

In another example, the underlying layer is continuous.

In one embodiment, the reference plane lies between the sensitive material layer and a plurality of lines forming electrodes located on the opposite side of the electrode layer to that sensitive material layer.

Also in one embodiment, the electrode layer and the sensitive material layer are each formed of portions, each portion of the electrode layer being situated at one or the other of two depths relative to the reference plane, and each portion of the sensitive material layer extending along a portion of the electrode layer.

For example, the portions of the electrode layer at a shallow depth constitute summits of lands that project relative to portions of the electrode layer at a second depth.

For example, the portions of the electrode layer at a shallow depth constitute a surface of a grid projecting from portions of the electrode layer at a second depth.

The invention also proposes a method of fabricating a data storage medium wherein there are formed on a surface of a carrier substrate an electrode layer and a sensitive material layer, characterized in that the electrode layer is conformed from an electrically insulative material by having the electrically insulative material delimit a plurality of conductive portions.

The electrode layer is preferably fabricated by a step of bonding two monocrystalline structures to form at bonding interface between the two monocrystalline sublayers a crossover of dislocations, said bonding step being followed by a step of diffusion of conductive material through one of said structures to form conductive lines in said dislocations. At least one of the two structures is advantageously thinned before the deposition of or after the diffusion of the conductive material.

For example, a first of the two monocrystalline structures consists of the surface portion of the substrate. After producing the electrode layer, the sensitive material layer is formed by a deposition process.

In one embodiment, the electrode layer is formed by depositing a conductive material layer on the sensitive material layer and conductive portions are delimited in said conductive material layer by operations of etching and depositing at least the electrically insulative material, and the electrode layer is then bonded to said carrier substrate by molecular bonding.

According to one feature, connecting portions connecting said conductive portions are formed within said conductive material layer.

According to another feature, the conductive portions take the form of conductive material lands isolated by etching said conductive material layer, called the first conductive layer, and there is deposited on said first conductive layer a second conductive layer interconnecting said conductive material lands.

The second conductive layer is continuous, for example.

BRIEF DESCRIPTION OF THE DRAWING

The invention is described in more detail next, with reference to the appended drawings, in which.

DETAILED DESCRIPTION

Figure 1:
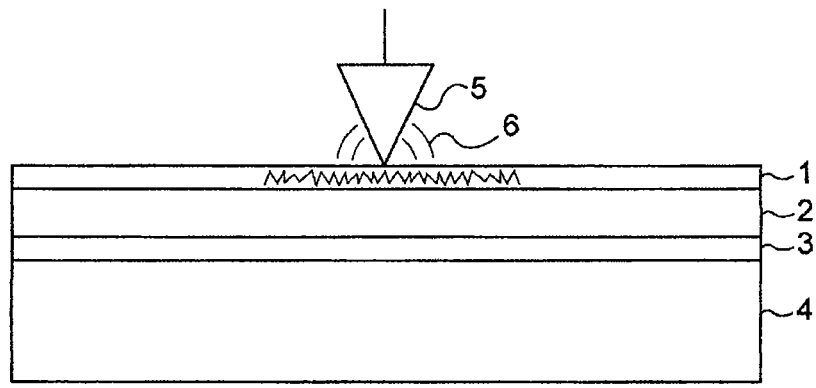
FIG. 1 represents a prior art data storage medium and a step of writing a nanodomain by moving a near field microscope tip closer and applying an electrostatic field.

FIG. 1 shows a prior art data storage medium.

The data storage medium includes a ferro-electric layer 1, for example of lithium tantalate ($LiTaO_3$) crystal, deposited on a continuous electrically conductive layer 2 which can be of metal, for example of platinum.

The electrically continuous layer 2 is on a substrate 4. An interleaved oxide layer 3 can facilitate bonding the metal to the substrate.

A near field microscope tip 5 is moved close to the data storage medium, facing the ferro-electric layer 1, perpendicularly to the ferro-electric layer, and at a distance from the edges of the storage medium, in particular the edges of the metal layer 2.

The metal layer 2 therefore has dimensions in both directions in its plane greater than the transverse dimension of the near field microscope tip 5 by at least one order of magnitude. This layer can even extend over the whole of the storage medium.

An electric field is produced between the near field microscope tip 5 and the metal layer 2.

The field lines 6 that are formed between the near field microscope tip 5 and the metal layer 2 are not influenced by the edges of the metal layer (which are a great distance away, see above) and are the same as those that would be formed if the metal layer were of infinite size in its plane.

The electric field formed in this way causes a modification of polarization in an area 7 of the ferro-electric layer 1 under the microscope tip 5.

The area 7 of particular polarity formed in this way is referred to as a nanodomain.

Figure 2:
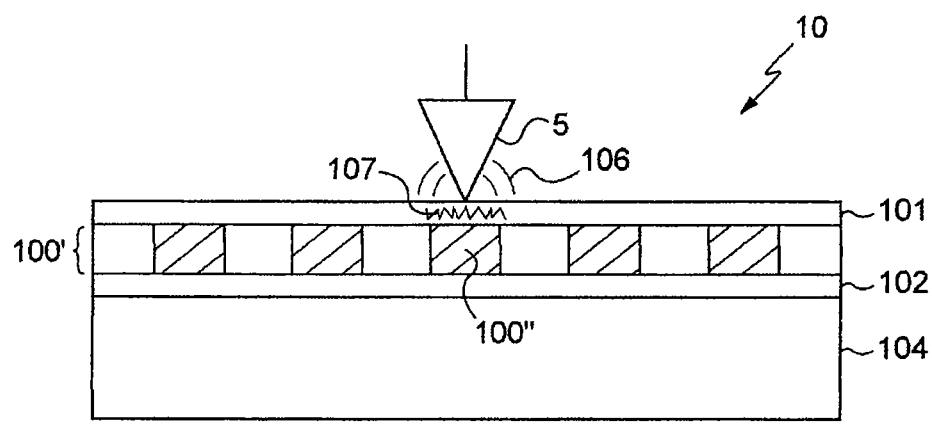
FIG. 2 shows in section a data storage medium of a first embodiment of the invention.

FIG. 2 shows in section a first embodiment of a data storage medium 10 of the invention.

The data storage medium 10 includes an electrically conductive, for example metal, structure constituting an electrode 100'.

The electrode 100' contains platinum Pt or, alternatively, a metal chosen from the metals Cr, Ru, Ni, Al, Au, Fe, Ti, W. It can also comprise an alloy or indium-tin oxide ITO.

The electrode 100' lies in a plane perpendicular to the plane of FIG. 2, and has a typical thickness of 25 nm perpendicular to its plane, but there is no limit on this thickness. It can therefore be as much as several microns or even several tens of microns.

In the plane of FIG. 2, the electrode includes spaced metal areas 100" and an insulative material, here silica $SiO_2$.

In the embodiment shown, the metal areas are spaced substantially regularly in the section plane, but, alternatively, they are variably spaced.

A layer of ferro-electric material, for example a layer 101 of lithium tantalate $LiTaO_3$ here, is situated on the electrode layer. It covers the metal areas 100" and the insulative material $SiO_2$.

Alternatively, the ferro-electric material used is $BaTiO_3$, $SrTiO_3$, $LaAlO_3$ or any other ferro-electric material, even a non-monocrystalline material such as PZT $(PbZr)TiO_3$, $Bi_4Ti_3O_{12}$ or $SrRuO_3$.

The electrode layer 100' is itself situated on a host substrate 104, here of silicon, with an intermediate oxide layer 102.

Alternatively, the host substrate 104 can be in silicon carbide SiC, sapphire or germanium Ge, for example.

As a result the electrode layer is buried in the data storage medium 10, not reaching its free surfaces.

In the configuration shown in FIG. 2, a conductive near field microscope tip 5 has been moved close to the data storage medium 10, facing the ferro-electric layer 101.

The microscope tip 5 has a radius of curvature less than 100 nm, typically from 10 to 20 nm.

It has been moved close to the ferro-electric layer 101 so that the tip 5 is located on a straight line segment perpendicular to the plane of the ferro-electric layer 101 (or the electrode 100') more or less centered in a conductive area 100".

The microscope tip comes into contact with the surface of the ferro-electric layer 101.

Alternatively, the tip 5 is positioned a few nm from the layer 101, facing the conductive area 100", the microscope operating in resonant mode (AFM tapping mode).

An electric field is then applied between the electrode layer 100' and the near field microscope tip 5; the field lines 106 pass through a portion of the ferro-electric layer 101.

When an electric field of this kind is applied between the conductive near field microscope tip 5 and the electrode consisting of the buried metal layer 100', the field lines 106 are formed between the microscope tip and the conductive area 100", which are two elements where the facing portions have dimensions of the same order of magnitude.

The lines of the electrostatic field are thus formed in a smaller volume than in prior art devices. The field lines are focused and depart little from the space situated between the near field microscope tip 5 and the conductive area 100" facing it.

As a result a nanodomain 107 is formed on the ferro-electric layer 101, but this nanodomain is of smaller size (measured in the section plane of the FIGURE) than in prior art devices, which size can depend on the width (in the section plane of the FIGURE) of the conductive area 100" or on the radius of curvature of the tip, depending on the respective dimensions of these two elements. Be this as it may, the maximum size of the nanodomain will be a function of the width of the conductive area 100".

The medium has a reference plane globally parallel to the sensitive material layer, adapted to have tip 5 pass alont it.

FIGS. 3, 4A to 4C, 5A and 5B are views from above of different variants of the electrode of the device.

Figure 3:
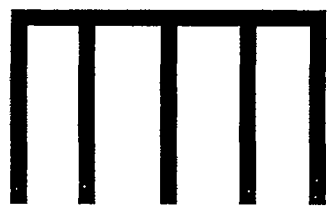
FIG. 3 shows from above an electrode of the storage medium from FIG. 2 consisting of parallel conductive lines.

In a first variant, shown in FIG. 3, the electrode consists of parallel strips electrically interconnected by a single transverse strip. This single transverse strip can be in the same plane as the parallel strips or in an offset plane, in which case it is nevertheless in contact with the parallel strips. Generally speaking, the parallel strips can be electrically connected to each other in any way.

The strips have identical widths, for example of 50 nm. Alternatively, the strips are of varying width, but generally speaking their width is less than 100 nm.

Figure 4A:
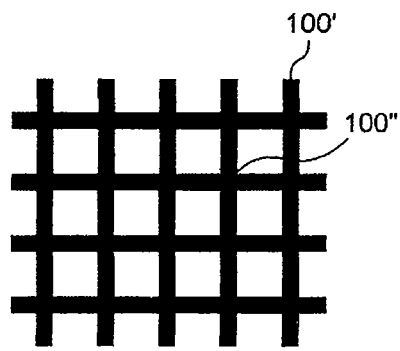
FIGS. 4A to 4C are diagrams showing from above shapes for the metal electrode of the FIG. 2 data storage medium, the electrode comprising a trellis of conductive lines at right angles.

In a second variant, shown in FIG. 4A, the electrode is in the form of a trellis consisting, in its plane, of two series of conductive strips.

The strips of a given series are substantially parallel to each other and the two series of strips are substantially perpendicular to each other.

In the embodiment shown, the strips of the two series have identical widths, for example of 50 nm. Alternatively, the strips are of varying width, between the two series and within the same series. However, generally speaking, the width of the strips is less than 100 nm.

Each intersection of two strips defines a storage area 100", all the storage areas 100" being electrically interconnected by the conductive strips.

Figure 4B:
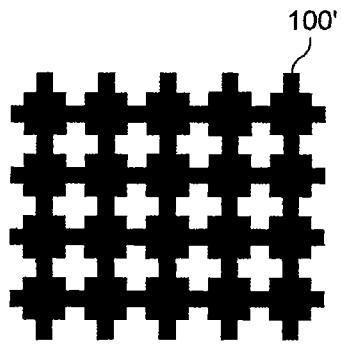

In a third variant, shown in FIG. 4B, the electrode consists of a trellis, wide metal fragments of rectangular or even square shape being present at the intersections.

The insertion of wide conductive areas at the intersections of the conductive strips enables the controlled formation of nanodomains having the shape of the wide area.

Figure 4C:
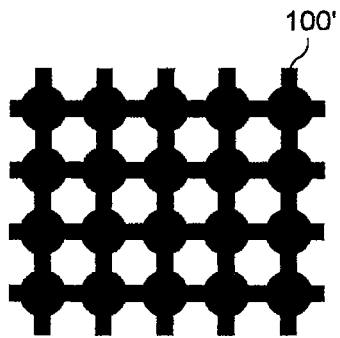

In a fourth variant, shown in FIG. 4C, the electrode also consists of a trellis, wide metal fragments of cylindrical shape being present at the intersections.

Figure 5A:
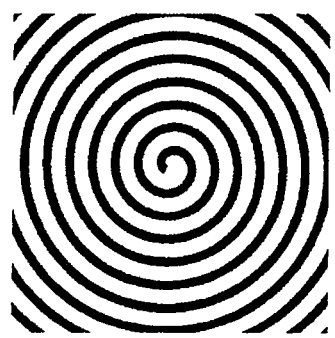
FIGS. 5A and 5B show from above shapes of the electrode of the data medium from FIG. 2, the electrode including a curved line, here a spiral.

In a fifth variant, shown in FIG. 5A, the electrode features a spiral metal track of constant width. The width could of course vary along the spiral.

Figure 5B:
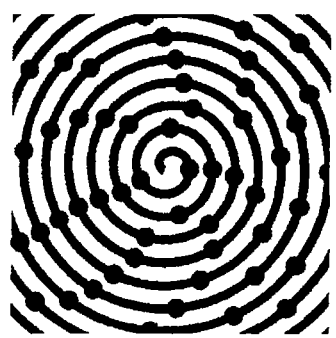

In a sixth variant, shown in FIG. 5B, the electrode features a spiral metal strip with protuberances from place to place that define storage areas.

The writing areas have at least one dimension in the plane less than 100 nm.

FIGS. 6A to 6D show one embodiment of a method of fabricating a storage medium as shown in FIGS. 2 and 3A to 3C and 5A or 5B, constituting a first embodiment of a method of the invention.

Figure 6A:
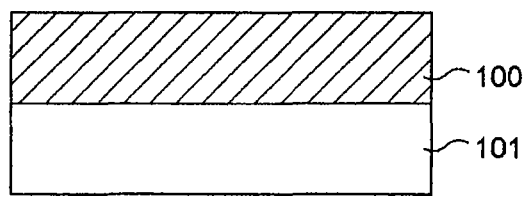
FIGS. 6A to 6D show successive steps of one example of a method of fabricating a storage medium as shown in FIG. 2, 3, 4 or 5.
Figure 6B:
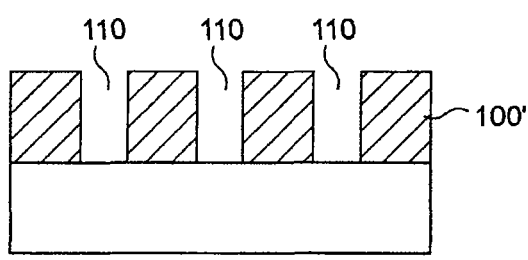

An originally continuous metal layer 100 (here produced in platinum Pt) is deposited on the surface of a ferro-electric material substrate 101 (FIG. 6A).

Holes 110 are then formed in this metal layer 100, for example by electron beam lithography.

A resin lithography mask is used during this step, for example, through which are etched holes separated by lines constituting the electrode 100'.

The ferro-electric layer serves as a stop layer on selective etching of the metal layer 100.

Figure 6C:
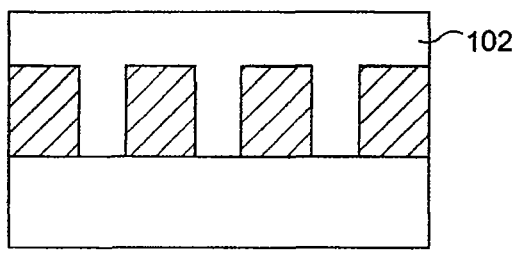

Referring to FIG. 6C, a non-conductive material is then deposited in the holes 110 and on the remaining metal areas. In the embodiment shown the non-conductive material used is an oxide 102.

A step of leveling the oxide 102 can then be effected.

Figure 6D:
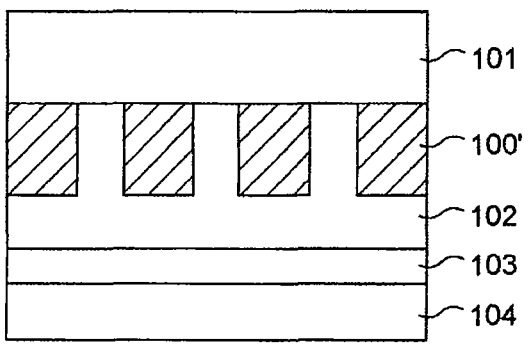

In a final step, shown in FIG. 6D, the combination of the ferro-electric layer 101, the metal layer 100 and the oxide 102 is molecularly bonded to a substrate 104.

Alternatively, an oxide layer 103 can be interleaved between the substrate 104 and the combination of the ferro-electric layer 101, the metal layer 100 and the oxide 102.

Moreover, molecular bonding can be replaced by bonding using a bonding agent of any known appropriate type, for example an organic bonding agent.

The ferro-electric material substrate 101 is then thinned by grinding and/or CMP (chemical-mechanical polishing), which techniques can optionally be associated with heat treatment.

Alternatively, thinning can be achieved producing a fracture in a buried fragile area created, for example, by implantation, as described in the document U.S. Pat. No. 6,607,969. Implantation can be carried out before or after depositing the metal layer.

In a variant of the fabrication process, the electrode layer can be fabricated by other lithographic techniques: lift-off, nano-imprint, FIB, optical lithography, etc.

Figure 7:
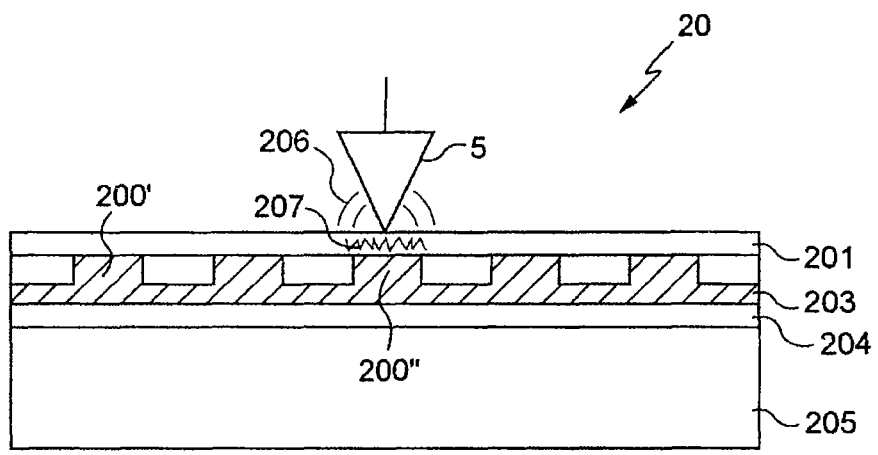
FIG. 7 shows in section a data storage medium conforming to a second embodiment of the invention.
Figure 8A:
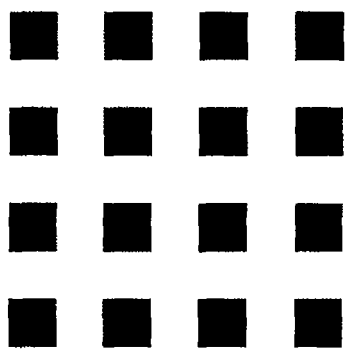
FIGS. 8A and 8B are diagrams showing from above two variants of the shape of the metal electrode of the data storage medium of FIG. 4, FIGS. 9A to 9E show successive steps of one example of a method of fabricating a storage medium as shown in FIG. 7, 8A or 8B.
Figure 8B:
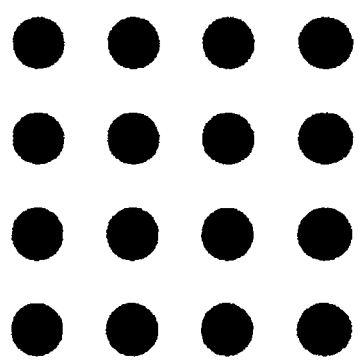

FIGS. 7 and 8A-8B show a second embodiment of a data storage medium of the invention respectively in section and from above.

This kind of data storage medium 20 includes an electrode including lands 200' and a metal layer 203 relative to which the lands project.

FIGS. 8A and 8B show possible examples of the shape and arrangement of these projections 200'. In FIG. 8A, the projections are circular base cylinders and in FIG. 8B the projections are parallelepipedal lands.

The data storage medium 20 also includes a ferro-electric layer 201 placed on the electrode, itself placed on a substrate 205 (which can be of silicon, for example), possibly with an intermediate oxide layer 204.

As before with other data storage media, a near field microscope tip 5 is positioned above the data storage medium.

Facing this microscope tip, the electrode has a conductive area 200" with a maximum dimension in the plane of the metal layer less than 100 nm.

In the embodiment described, the conductive area 200" takes the form of a land, and its diameter is less than 100 nm.

When an electric field is applied between the near field microscope tip and the electrode, the field lines 206 are formed between the microscope tip and the protuberance of the conductive area 200".

Here the height of the lands is 50 nm, and in variants it is from 10 to 100 nm. As for the thickness of the continuous layer 203, it is 50 nm, for example. This thickness is not of a limiting nature, and the continuous layer can be much thicker; it can be the substrate 205 itself if it is sufficiently conductive, for example if it is of metal or degenerated silicon.

The lines of the electrostatic field are therefore formed in a restricted volume; they are focused and depart little from the space situated between the near field microscope tip 5 and the conductive area 200" facing it.

As a result a nanodomain 207 is formed on the ferro-electric layer 201 and that nanodomain is of small size; its maximum size depends on the width of the conductive area 200".

FIGS. 9A to 9E show an embodiment of a fabrication process of a medium as shown in FIGS. 7 and 8A-8B, constituting a second embodiment of a method of the invention.

In FIG. 9A, a continuous metal layer 200 in chromium Cr is deposited on the surface of a ferro-electric layer 201 of lithium tantalate $LiTaO_3$. Alternatively, other metals are used instead of chromium, and other ferro-electric materials are used instead of lithium tantalate.

By a lithographic process analogous to that described above with reference to FIG. 6B, openings are formed in the metal layer 200 to leave metal lands 200' separated from each other.

A resin mask is used for this purpose, through which the layer is excavated all around the lands. A structure as represented in FIG. 9B is obtained.

The method then continues with the deposition of an insulative material 202 between the lands 200'. This material can be an oxide, for example silicon oxide, or a nitride.

Alternatively, the material 202 covers the lands entirely so that they are completely buried. The method then continues with a step (not shown) of leveling the insulative material, which is carried out so as to leave, on completion, the metal lands opening onto the free surface of the device formed by the ferro-electric layer, the metal layer and the oxide.

In an embodiment shown in FIG. 9C, the silicon oxide 202 is deposited before removing the mask used to etch the lands almost up to the top of the lands and covers only part of their height. The level of the surface of the oxide layer is therefore directly below the level of the surface of the lands 200'. The mask can then be removed.

A subsequent step, shown in FIG. 9D, includes the deposition of a metal layer 203 on the metal lands so that each land 200' is in contact with the metal layer 203 to ensure continuity of electrically conductive material from one land to the other, thus forming an electrode.

The material of this layer 203 is the same as that of the layer 200, or alternatively it can be another conductive material, like those indicated above.

Referring to FIG. 9E, the process is then completed by bonding the metal layer 203 to a substrate 205, for example of silicon, possibly with an intermediate oxide layer 204.

The ferro-electric substrate 201 is then thinned, as described with reference to the first embodiment of the method of the invention.

In a third embodiment of a data storage medium, shown in FIG. 7, a data storage medium 30 is used that includes a nanostructured interface as described in the PCT Patent Application Publication Nos. WO 99/05711 and WO 0 229 876.

Figure 10:
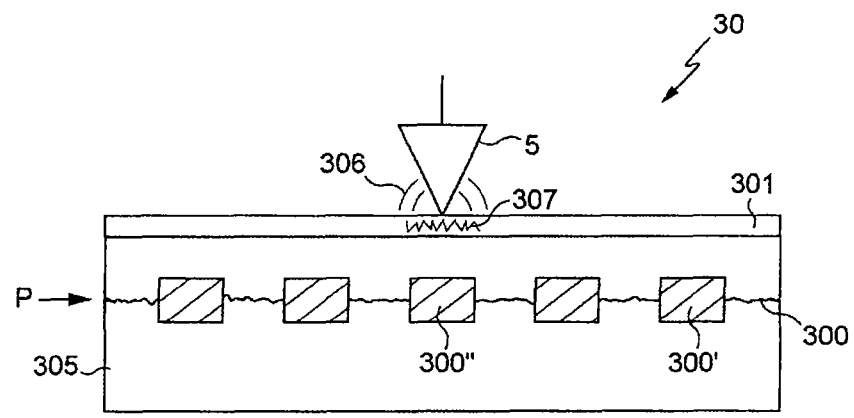
FIG. 10 shows in section a data storage medium of a third embodiment of the invention.
Figure 11A:
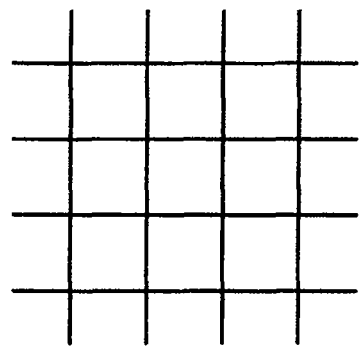
FIGS. 11A and 11B are diagrams showing from above the shape of the metal electrode of the data storage support from FIG. 10, FIGS. 12A to 12D show successive steps of a method of fabricating a storage medium as shown in FIGS. 10, 11A, 11B, FIGS. 13A and 13B each show in section two variants of a data storage medium according to a fourth embodiment of the invention.
Figure 11B:
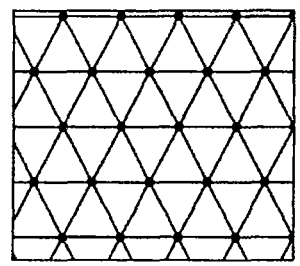

FIG. 10 is a view in section of this kind of storage medium and FIGS. 11A and 11B are views from above of the electrode for two variants of this kind of storage medium.

Referring to FIG. 10, a silicon support 305 includes, generally in a plane P, an array 300 of dislocations.

Conductive metal lines are formed by depositing, diffusing and agglomerating a conductive material (for example a metal) in the dislocations. The array of dislocations can be square, in which case the metal lines in the dislocations form a square array as shown in FIG. 11A. Alternatively, the array can be rectangular or triangular, as shown in FIG. 11B.

At the intersections of the metal lines are metal areas serving as information storage areas.

In the embodiment shown in FIG. 11A, the density of the metal at these intersections is substantially the same as the density of the metal in the metal lines at a distance from the intersections.

Alternatively, the density at the intersections can be higher than in the metal lines, because of a greater agglomeration of metal, as shown in FIG. 10 and in FIG. 11B.

The nanostructured layer is buried to a depth of 10 nm relative to the surface of the support 305. In variants, it is buried to a depth from 3 to 50 nm.

On the surface of the support 305 is a layer 301 of ferroelectric material, here lithium tantalate. The distance between the nanostructured layer and the layer 301 is therefore 10 nm here.

As before, a near field microscope tip 5 is positioned above or in contact with the data storage medium.

The metal of the metal lines formed in the dislocations 300 constitutes an electrode which has, facing the microscope tip, a conductive area 300" at the intersection of two dislocations.

This conductive area 300" has a dimension less than 10 nm.

When an electric field is applied between the near field microscope tip and the electrode, the field lines 306 are formed between the microscope tip and the conductive area 300".

Thus the lines of the electrostatic field are formed in a restricted volume: they are focused, and depart little from the space situated between the near field microscope tip 5 and the conductive area 300" facing it.

As a result a nanodomain 307 is formed on the ferroelectric layer 301, which nanodomain is of very small size, typically less than 10 nm.

Clearly the size of the nanodomain depends on the width of the conductive area 300".

FIGS. 12A to 12D show a method of fabricating a data storage medium 30 of this kind.

Figure 12A:
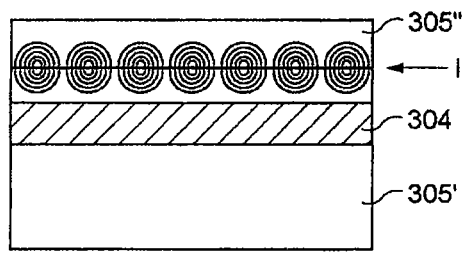

In FIG. 12A, two monocrystalline structures 305' and 305" (for example of silicon) are in contact with each other at two faces forming an interface I. The structure 305' is thicker than the structure 305", for example, and is four times thicker than the structure 305", for example. Other thickness ratios are obviously possible.

One of the structures, here the structure 305', contains an oxide layer 304 that divides it into two separate crystalline blocks.

In a variant (not shown), the structure 305' contains no oxide layer and consists of a single crystalline block.

The two structures 305' and 305" are assembled together by molecular bonding so that the crystalline arrays of the facing faces have at least one mismatched parameter, as explained in the PCT Application Publication Nos. WO 99/05711 and WO 02/29876.

As a result of this there is, along the interface I, an array of dislocations, referred to as nanostructuring, caused by the mismatch between the crystal lattices of the two faces constituting the interface.

As a function of the crystalline disorientation and/or crystal lattice mismatches of the structures 305' and 305", the nanostructuring produces dislocations arranged in an array that can be rectangular, square or triangular and whose geometrical characteristics (for example the pitch) can be chosen as necessary.

One of the structures, here the structure 305", is then thinned to adjust the depth of the array of dislocations relative to the free surface of the structure 305". This thinning could alternatively take place after the formation of the nanogrid described below.

Figure 12B:
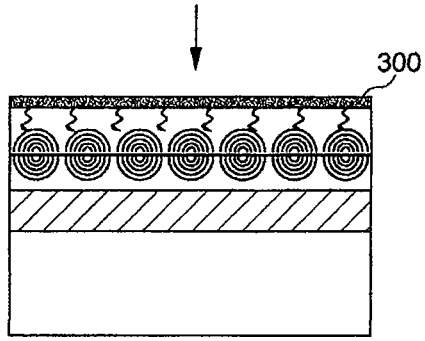

Referring to FIG. 12B, metal 300 is deposited on the free surface of the structure 305".

The metal 300 then migrates by thermal diffusion into the dislocations which for the metal constitute privileged segregation areas. In the present embodiment, the metal deposited is gold (Au) and the diffusion temperature is 500° C., applied for 1 minute.

The metal therefore forms a nanogrid in the trenches of the nanostructure.

Alternatively, in an embodiment in which the structure 305' has no oxide layer, the metal layer 300 is deposited on the free face of the structure 305'.

The metal then migrates into the structure 305', as far as the dislocations, the applied temperature being 500° C. and the migration time being 15 hours. The free surface of 305" is kept free of deposit.

Alternatively, copper is deposited on the free surface of the structure of 305" and a migration period of two days at room temperature is used.

Alternatively, copper is deposited on the free surface of 305", the copper migrating for 5 minutes at a temperature of 200° C.

Alternatively, copper is deposited on the free surface of 305', and the copper migrates for 2 hours at 200° C.

An advantage of this method is the collective fabrication of the metal grid, with a controlled pitch, of from 10 to 100 nm, for example, by choosing the crystal lattice mismatch as described in the PCT Patent Application Publication Nos. WO 99/05711 and WO 02/29876.

For example, a rotational disorientation of 0.440 produces a pitch of 50 nm.

The metal areas obtained are of small size because the metal spreads only approximately 1 to 3 nm around the dislocations.

Figure 12C:
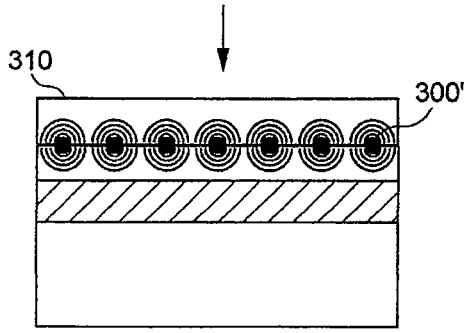

Referring to FIG. 12C, the surplus metal is removed if necessary, to obtain a clean free surface of 305".

Note that there is therefore no electrode flush with the surface 310 of the structure, leaving the silicon surface perfectly plane, compatible with molecular bonding.

A thinning step (not shown) can be carried out at this stage to adjust the depth of the electrode relative to the free surface of the structure 305' or the free surface of the structure 305", if necessary.

Figure 12D:
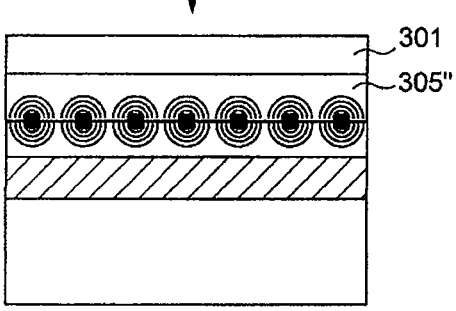

Referring to FIG. 12D, a layer 301 of ferro-electric material is then deposited on or transferred to the surface of the structure 305" exposed in this way.

Clearly prior deposition of an oxide layer is not necessary, given the quality of the surface 310.

Alternatively, the metal, instead of being deposited on the free surface of the structure 305' or on the free surface of the structure 305", is implanted via one of the free surfaces, either that of the structure 305' or that of the structure 305".

For example, particles of copper or gold can be implanted with an energy of 10 keV and a dose of $5.10^{15}$ atoms/cm$^2$, for example.

Appropriate heat treatment then causes the implanted species to migrate toward the dislocations.

Figure 13A:
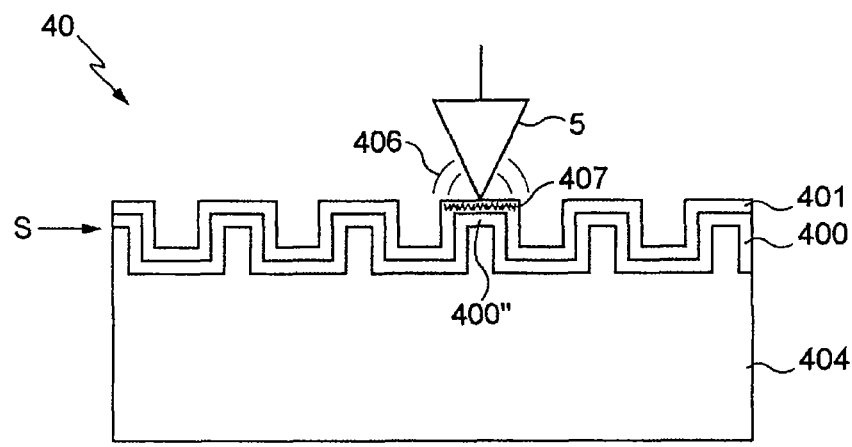
Figure 13B:
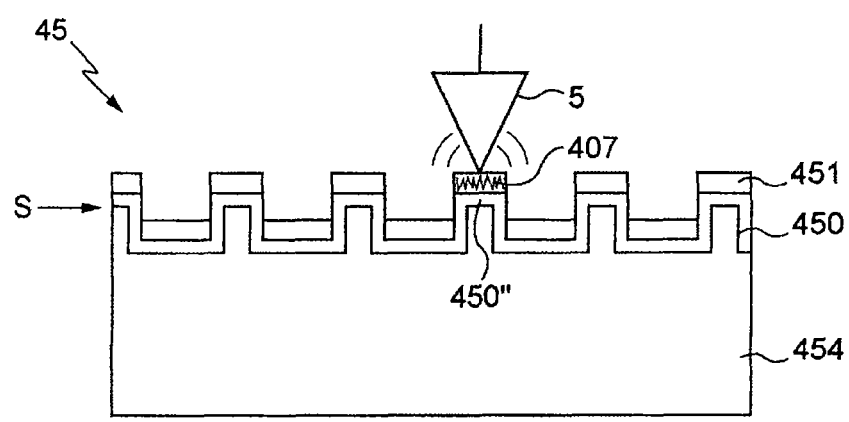

In a fourth embodiment of a data storage medium, two variants of which are shown in FIGS. 13A and 13B, the medium comprises a substrate having a nanostructured surface S as described in the European Patent Application No. EP 1 803 683 (or French Application No. FR 2 895 391).

Referring to FIG. 13A, a silicon substrate 404 has a nanostructured surface S that has peaks and troughs around a mean surface.

The height difference between the bottom of the troughs and the top of the peaks is 5 to 10 nm on average, for example. It is precisely adjusted.

A metal layer 400 covers the nanostructured surface S. The metal layer 400 is continuous, but alternatively it is discontinuous, perforated, all its parts nevertheless being interconnected around holes.

Furthermore, the metal layer 400 has a high affinity for the substrate 404, and is in contact with the latter over the whole of the nanostructured surface, at the bottom of the hollows of the nanostructure, at the top of its peaks and along the sides of the peaks.

The metal layer 400 also has a substantially constant thickness, and its surface opposite the substrate 404 reproduces accurately the nanostructure of the nanostructured surface S. The surface of the metal layer 400 opposite the substrate 404 consequently has peaks and troughs similar to the peaks and troughs of the nanostructured surface of the substrate 404.

A ferro-electric layer 401 of lithium tantalate covers the metal layer 400. Here the ferro-electric layer 401 is continuous. Moreover, it has a high affinity for the metal of the metal layer 400, and is in contact with the latter at the bottom of the recesses, at the tops of the peaks of the metal layer 400 and along the sides of the peaks.

As before with other data storage media, a near field microscope tip 5 is positioned above the data storage medium 10, or in contact with it.

The electrode has a projection 400" in vertical alignment with the microscope tip 5.

An electric field is applied between the metal layer and the near field microscope tip 5; the field lines pass through a portion of the ferro-electric layer 401. The field lines are focused and depart little from the space situated between the microscope tip 5 and the metal projection 400" facing it.

As a result a nanodomain 407 is formed on the ferro-electric layer 401 and is of small size, its maximum size depending on the width of the peak of the projection 400".

FIG. 13B shows a variant. A data storage medium 45 includes a substrate 454 that has a nanostructured surface S as described above. A metal layer 450 is present on the nanostructured surface of the substrate 454.

A deposit 451 of ferro-electric material is present on the surface of the metal layer 450; it covers the bottom of the recesses of the surface of the metal layer 450 and the top of the peaks; however, it does not cover the sides of the metal projections. This deposit 451 of ferro-electric material is therefore discontinuous.

When a near field microscope tip 5 is moved close to the data storage medium 45, facing a metal projection 450", and an electric field is applied between the electrode and the microscope tip 5, the field lines pass through an area 451 of ferro-electric material. They are focused and depart little from the space situated between the microscope tip 5 and the metal projection 450" facing it.

As a result a nanodomain 457 is formed on the ferro-electric layer 401 and is of small size, its maximum size depending on the width of the peak of the projection 450" and on the size of the fragment of ferro-electric material deposited on the peak of the metal projection 450".

In this variant, the electric field applied between the microscope tip 5 and the electrode 450 can be higher than that applied in the previous variant, shown in FIG. 13A, so that it is more clearly differentiated from background noise. This is made possible by the material or spatial limitation of the deposit of ferro-electric material on the peak of the projection 400".

One embodiment of a method of fabricating a data storage medium device 40 is described next.

Based on the teachings of French Patent Application No. FR 2 895 391, a substrate is prepared having a surface structured at the nanometer scale, in particular, a surface having recessed areas and projecting areas.

A quantity of metal is then deposited at low temperature (for example room temperature) to obtain a continuous layer of metal. The affinity of the metal for the substrate is made sufficient for this.

The layer of metal then obtained is nanostructured, because of the projections and recesses of the substrate.

For example, a layer of metal, here of platinum, is deposited on the nanostructured surface. In one embodiment, the deposited layer of metal has a typical thickness of 25 nm, but this thickness can vary according to the depth of the structure of the initial surface and the more or less conforming appearance of the deposited metal layer.

Alternatively, a conductive substrate (for example of degenerated silicon) having a structured surface could be used directly.

A ferro-electric layer, here consisting of lithium tantalate, is then deposited on the metal layer, so that the ferro-electric layer adheres strongly to the metal and follows the nanostructures of the metal layer, reproducing it on its surface.

In one embodiment the deposited ferro-electric layer is relatively thick compared to the nanostructures and remains continuous.

Selected areas in the volume of metal at the tops of the nanostructures form storage areas that follow the surface structure.

Alternatively, the ferro-electric layer is thin compared to the amplitude of the nanostructures. The ferro-electric layer is then discontinuous, with holes in it. The storage areas are then separated in particular by discontinuities in the ferro-electric layer.

The various embodiments of a data storage medium described above can be used for writing and reading data by the method described next.

Several physical examples of data storage media are available, and the same reading and writing device is used with these various examples.

A near field microscope tip moves above a free surface of one physical example of a data storage medium, above a ferro-electric layer as described above.

The position of the storage areas is stored beforehand in a memory of a control unit of the read and write device, which controls the movement of the microscope tip.

In one embodiment, the microscope tip is aligned on the physical example of a storage medium with the aid of a system of patterns.

In practice alignment is effected at least once for each example of data medium. In one embodiment, it is effected several times, in a spaced manner, possibly regularly spaced. In an advantageous embodiment, continuous alignment is moreover effected.

Thus it can be effected several times during the writing or reading operation with the aid of the same system of patterns. In another variant, alignment is effected several times with the aid of several systems of patterns.

In another embodiment, alignment is effected whilst continuously measuring with the microscope tip a local signal which in one variant is a capacitance and in another variant is a current or a voltage, using known near field microscopy techniques.

When the microscope tip is approaching vertical alignment with a data storage area, defined as previously explained at least by a density of conductive material surrounded by a non-conductive area, the near field microscope measures a local extremum of the signal. Alignment is then effected by trial and error around the stored positions.

If the signal measured is a current, the extremum is a maximum, and if the signal measured is a capacitance, the extremum is a minimum.

The local signal is measured below the energy threshold necessary to change polarization so as not to modify the information stored in the nanodomain.

In an advantageous embodiment alignment is effected using both a system of patterns to carry out the initial alignment and local signal measurement for regular repositioning of the microscope tip during its movement, using a tracking technique.

Figure 14A:
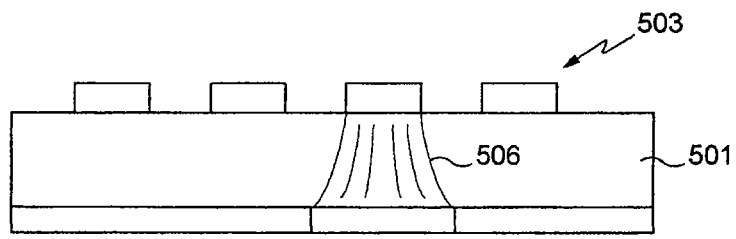
FIGS. 14A, 14B and 14C show a data storage medium conforming to a fifth embodiment of the invention in section in two perpendicular directions and from above.
Figure 14B:
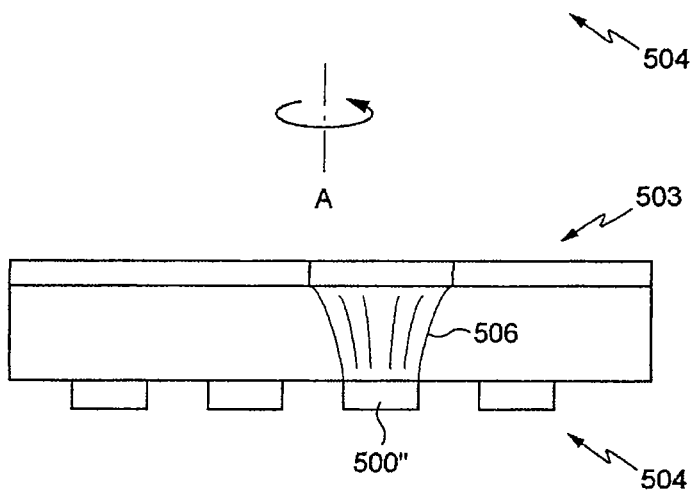
Figure 14C:
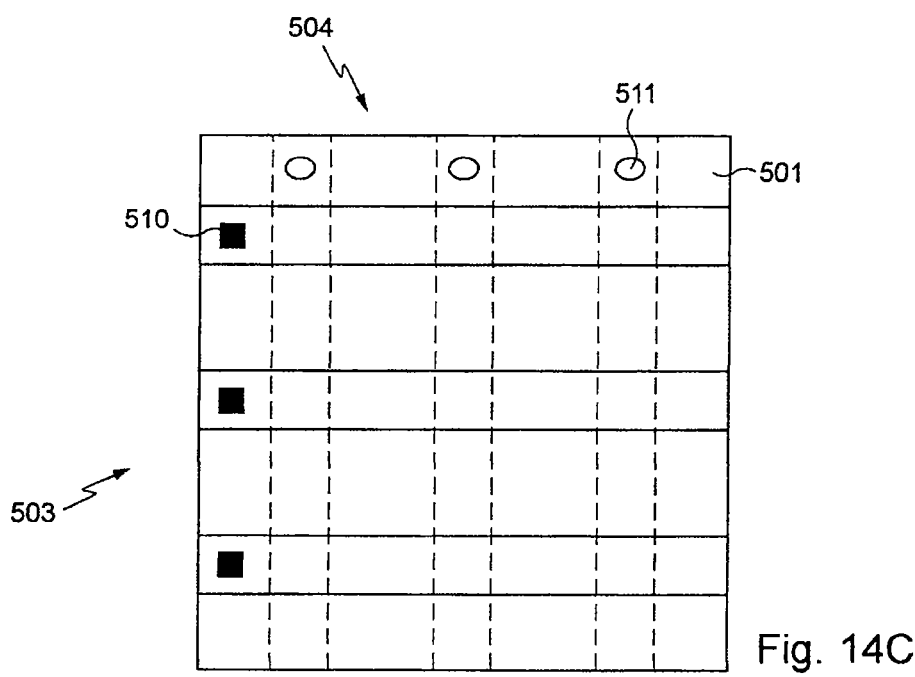

In a fifth embodiment of a data storage medium, represented in FIGS. 14A, 14B and 14C, a ferro-electric layer 501 is interleaved between two metal arrays 503 and 504.

The data storage medium is shown in section in FIGS. 14A and 14B, the FIG. 14B view being obtained from the FIG. 14A view by rotation through 90° about an axis A in the plane of the FIG. The FIG. 14C view is a view from above.

Each of the arrays 503 and 504 is formed of a set of substantially parallel tracks electrically independent of each other. The direction of the tracks of the array 503 is perpendicular to the direction of the tracks of the array 504.

Each track of the first array 503 has a contact area 510 at one end. Each track of the second array 504 also has a contact area 511 at one end. This contact area is used to polarize the track by applying a given electrostatic potential to it. Alternatively, the contact area is on the track, at a distance from its ends.

The polarization of a track is effected by means of a near field microscope tip moved close to the contact area.

In a variant, each track is polarized by a standard addressing system.

When a first track forming part of the first array and a second track forming part of the second array are polarized to different electrostatic potentials, an electric field is formed between an area of the first track centered on the area of the first track onto which the second track is orthogonally projected and an area of the second track centered on the area of the second track onto which the first track is orthogonally projected.

The field lines 506 of the electric field formed in this way pass through the ferro-electric layer. They are focused between two small areas, enabling a small nanodomain to be obtained, of a similar order of magnitude to the order of magnitude of the width of the tracks of the array 503 or the width of the tracks of the array 504.

The ferro-electric layer is then written in the space defined in this way.

This embodiment of a data storage medium is used by operating on the polarity of the contact areas 510 and 511, which are aligned at predefined positions.

It therefore achieves a higher reading or writing speed than a device including only one array of tracks and necessitating bidirectional scanning.

This embodiment also limits the problems of aligning a microscope tip.

The invention claimed is:

1. A data storage medium comprising:
   a carrier substrate having an electrode layer on the surface thereof;
   a sensitive material layer extending along the electrode layer and sensitive to localized modification between two electrical states under a localized electric field; and
   the storage medium having a reference plane globally parallel to the sensitive material layer, and configured to have at least one element passed along the reference plane for application of an electrostatic field in combination with the electrode layer,
   wherein the storage medium includes, parallel to the reference plane, a plurality of electrically conductive portions in the electrode layer and separated by interspersed electrically insulative zones in the electrode layer, the electrically insulative zones comprising an electrically insulating material different from the sensitive material layer, the electrically conductive portions and the interspersed electrically insulative zones being covered by the sensitive material layer, the electrically conductive portions having, in at least one direction parallel to the reference plane, a dimension at most equal to 100 nm,
   wherein at least some of the electrically conductive portions are electrically interconnected, the electrically conductive portions and the electrically insulative zones defining data write/read locations within the sensitive material layer, such that electric field lines are focused between the at least one element and the electrically conductive portions.

2. The storage medium according to claim 1, characterized in that said dimension is at most equal to 50 nm.

3. The storage medium according to claim 1, wherein each of the plurality of conductive portions is at a distance of less than 100 nm from an adjacent conductive portion, measured parallel to the reference plane.

4. The storage medium according claim 1, wherein the sensitive material layer comprises a ferroelectric material.

5. The storage medium according to claim 4, wherein the ferroelectric material comprises lithium tantalate $LiTaO_3$.

6. The storage medium according to claim 1 further comprising an oxide layer between the carrier substrate and the electrode layer.

7. The storage medium according to claim 1, wherein the electrode layer comprises a planar layer and the sensitive material layer comprises a planar and continuous layer.

8. The storage medium according to claim 7, wherein the conductive portions in the electrode layer comprise areas of crossover of lines of a first set of parallel conductive lines with lines of a second set of parallel conductive lines, the lines of the second set meeting the lines of the first set transversely, the first and second set of conductive lines interconnecting the conductive portions, wherein the lines of the first and second sets of conductive lines are coplanar.

9. The storage medium according to claim 8, wherein the conductive lines of the first and second sets are formed in dislocations at a bonding interface between two monocrystalline material structures in at least two different directions and interconnect the conductive portions.

10. The storage medium according to claim 8, wherein the conductive lines define rectangular or square mesh patterns.

11. The storage medium according to claim 7, wherein the conductive portions comprise lands projecting toward the sensitive layer from an underlying conductive material layer.

12. The storage medium according to claim 11, wherein the underlying conductive material layer comprises conductive lines crossing each other.

13. The storage medium according to claim 11, wherein the underlying conductive material layer comprises a continuous layer.

14. The storage medium according to claim 1, wherein the electrically insulative zones comprise a silicon oxide or a nitride.

15. A data storage medium comprising:
- a carrier substrate having an electrode layer on the surface thereof, wherein the electrode layer comprises a planar layer;
- a sensitive material layer extending along the electrode layer and sensitive to localized modification between two electrical states under a localized electric field wherein the sensitive material layer comprises a planar and continuous layer; and
- the storage medium having a reference plane globally parallel to the sensitive material layer, and configured to have at least one element passed along the reference plane for application of an electrostatic field in combination with the electrode layer,
- wherein the storage medium includes, parallel to the reference plane, a plurality of electrically conductive portions in the electrode layer and separated by at least one interspersed electrically insulative zone in the electrode layer, the electrically conductive portions and the at least one interspersed electrically insulative zone being covered by the sensitive material layer, the electrically conductive portions having, in at least one direction parallel to the reference plane, a dimension at most equal to 100 nm,
- wherein at least some of the electrically conductive portions are electrically interconnected, the electrically conductive portions defining data write/read locations within the sensitive material layer,
- wherein the conductive portions in the electrode layer comprise areas of crossover of lines of a first set of parallel conductive lines with lines of a second set of parallel conductive lines, the lines of the second set meeting the lines of the first set transversely, the first and second set of conductive lines interconnecting the conductive portions, wherein the lines of the first and second sets of conductive lines are coplanar,
- wherein the conductive lines of the first and second sets are formed in dislocations at a bonding interface between two monocrystalline material structures in at least two different directions and interconnect the conductive portions.

* * * * *